United States Patent [19]

Wondrak

[11] Patent Number: 4,689,620

[45] Date of Patent: Aug. 25, 1987

[54] METHOD AND APPARATUS FOR DATA TRANSMISSION BETWEEN A TRANSMISSION AND A RECEIVER DISPOSED IN A DRILL HOLE AND A TRANSMITTER AND A RECEIVER DISPOSED ABOVE GROUND

[75] Inventor: Thomas Wondrak, Dreieich, Fed. Rep. of Germany

[73] Assignee: Schilling Mess und Regeltechnik Industrievertretungen, Fed. Rep. of Germany

[21] Appl. No.: 761,619

[22] Filed: Aug. 1, 1985

[30] Foreign Application Priority Data

Mar. 20, 1985 [EP] European Pat. Off. ........ 85103220.1

[51] Int. Cl.$^4$ ............................................. G01V 1/00
[52] U.S. Cl. .................................... 340/856; 340/857
[58] Field of Search .......... 340/853, 856, 861, 870.19, 340/857, 858, 860; 166/250, 66; 175/40

[56] References Cited

U.S. PATENT DOCUMENTS 3,374,459  3/1968  Rabson et al. ...................... 340/856
4,360,710  11/1982 Chaput et al. .................... 179/84 R
4,603,318  7/1986  Philp ................................... 340/505

OTHER PUBLICATIONS

Diefenderfer, *Principles of Electronic Instrumentation*, ©1979, Saunders College Pub., pp. 89–90.

Primary Examiner—Charles T. Jordan
Assistant Examiner—John W. Eldred
Attorney, Agent, or Firm—Hill, Van Santen, Steadman & Simpson

[57] ABSTRACT

A method and an apparatus are provided for data transmission between a transceiver located in a drill hole and an above ground transceiver which are connected together by a two-wire line composed of an armoured, insulated copper core cable. The data are transmitted between the two transceivers via the two-wire line by successive, essential current-carrying time intervals. In the current-carrying time intervals, the portion of the transmitted energy is stored in the transceiver located in the drill hole, being stored therein for the current-free time intervals. The data are transmitted from the transceiver located in the drill hole to the transceiver disposed above ground by interrupting the current flow in the two-wire line or by short-circuiting the ends of the two-wire line, and are transmitted in the reverse direction by interrupt current feed of the two-wire line.

10 Claims, 6 Drawing Figures

METHOD AND APPARATUS FOR DATA TRANSMISSION BETWEEN A TRANSMISSION AND A RECEIVER DISPOSED IN A DRILL HOLE AND A TRANSMITTER AND A RECEIVER DISPOSED ABOVE GROUND

BACKGROUND OF THE INVENTION

1. Field of the Invention

The present invention relates to a method for data transmission between a transmitter and a receiver located below the ground in a drill hole and a transmitter and a receiver located above ground, and also to apparatus for implementing the method, in which data are transmitted between the transmitters and the receivers by way of a two-wire line by way of successive, essential current-carrying time intervals.

2. Description of the Prior Art

Transmitters and receivers located below ground and above ground are usually connected to one another via a cable which comprises two lines for the energy supply of the transmitter and the receiver in the drill hole and at least two lines for data transmission. Measured values regarding temperature, pressure and the like are acquired in the drill hole with the measuring instrument disposed at one end of the cable and are fed into the cable as signals with the assistance of the transmitter, the signals being in coded form, for example, and the above ground receiver acquires and amplifies the signals at the other end of the cable. The transmitter disposed above ground feeds control signals to the cable, these control signals being acquired by the below ground receiver, amplified and output to the measuring device. Cables greater than 10,000 m in length are required given very deep drill holes, whereby the transmitted signals are greatly attenuated. Intermediate amplifiers or repeaters are therefore necessary at certain intervals.

SUMMARY OF THE INVENTION

The object of the present invention is to improve a method of the type generally set forth above such that only two lines are required between the transmitters and receivers disposed above ground and below ground and such that no intermediate amplifiers or repeaters are necessary.

The above object is achieved in that data from the above ground transmitter and receiver are transmitted to the transmitter and receiver disposed in a drill hole by way of a two-wire line in a cable by successive, essentially current-carrying time intervals. In the current-carrying time intervals, a portion of the transmitted energy is stored in the transmitter and receiver device disposed in the drill hole, being stored for the current-free time intervals. The data from the transmitter and receiver located in the drill hole are transmitted to the transmitter and receiver disposed above ground by interrupting the current flow in the two-wire line or by short-circuiting the ends of the two wire lines and, in reverse direction, by interrupting the current fed into the two-wire line. With this method, a transmission which is not very susceptible to disruption is achieved with very little expense, even given great temperature differences in the various cable sections, as well as given different impedances as a consequence of the cable sections wound onto a winch and of the cable sections unwound from the winch. Only digital signals which are composed of pulses and pulse pauses or, respectively, of pulses having markedly different amplitudes are transmitted.

The data are preferably transmitted pulse-code modulated (PCM) on the two-wire line in order to achieve an optimally low susceptibility to disruption.

Apparatus for implementing the method described above provides that, in the transmitter and receiver disposed above ground, a switch actuatable by a control and evaluation device is located at least between one pole of the energy source and one line of the two-wire line and a current sensor connected to a threshold protector is disposed between at least one pole of the energy source and one line of the two wire line. In the transmitter and receiver device located in the drill hole, a further switch is disposed between the end of one line of the two-wire line and an operating voltage terminal for the loads in the transmitter and the receiver or one switch is disposed between the ends of the two-wire line. The switches are actuatable by a control and evaluation device. A threshold protector is connected to at least one line. The pulses can therefore be transmitted and discriminated with simple circuit-oriented devices. The switches are thereby advantageously designed as contactless switches.

In accordance with a preferred embodiment of the invention, the switches are Darlington transistors which are respectively connected to a field effect transistor fed by the control and evaluation device. Only low control currents are therefore necessary for the actuation of the switches.

Instead of Darlington transistors, power field effect transistors can also be used. It is possible to employ p-channel metal-oxide-semiconductor-field-effect-transistors (MOSFETs) which have nominal currents of 10 H given 300 V nominal voltage.

In accordance with the particular feature of the invention, the current sensor in the transmitter and receiver located above ground is a resistor which is connected to a pulse shaper. A potentiometer can be connected parallel to the resistor, the tap of the potentiometer being connected to the pulse shaper instead of the resistor.

The two-wire line is advantageously an armoured steel cable having insulated copper conductors. The one end of the steel cable to which the one transmitter and receiver device is secured is located in the drill hole. Such a steel cable is necessary in order to carry the dead weight of the cable as well as the weight of the transmitter and receiver and the measurement transducer connected thereto, even given great drill hole depth. Despite this, the data can be faultlessly discriminated with the above-described apparatus, even given a high transmission rate. The bore hole can, for example, be filled with salt water. The aforementioned cable offers good protection against damage to the insulation.

BRIEF DESCRIPTION TO THE DRAWINGS

Other objects, features and advantages of the invention will be best understood from the following detailed description, taken in conjunction with the accompanying drawings, on which:

DESCRIPTION OF THE PREFERRED EMBODIMENTS

Figure 1:
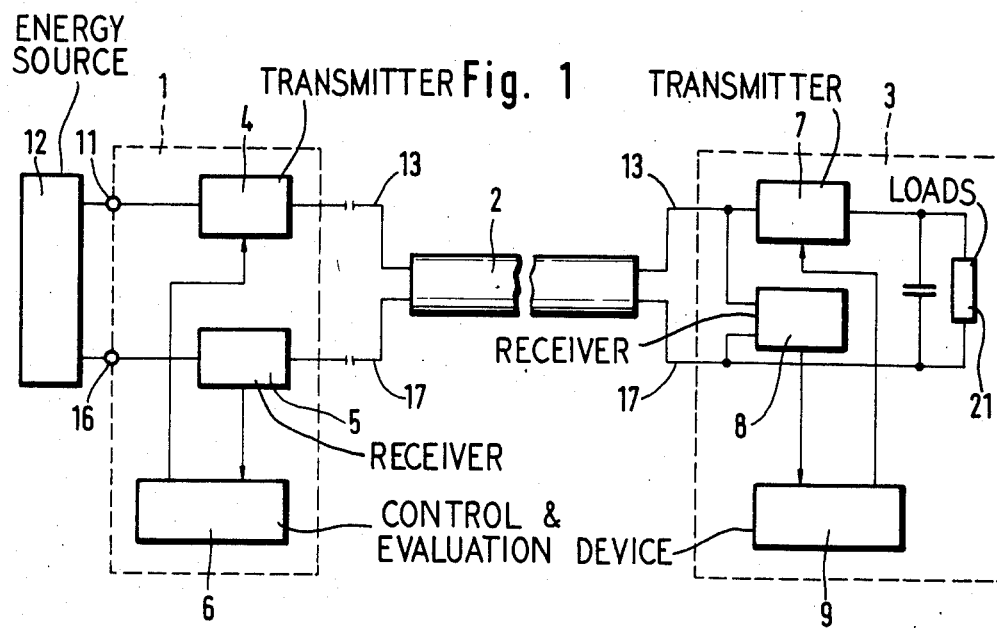
FIG. 1 is a block circuit diagram of respective transmitters and receivers disposed above ground and below ground and which are connected to one another via a dual conductor cable.

Referring to FIG. 1, a transmitter and a receiver will be hereinafter referred to as a transceiver. The above ground transceiver 1 is connected to the end of a cable 2 which represents the two-wire connection. The cable 2 can be wound onto a drum (not shown). The cable is armoured steel cable having insulated copper conductors. The other end of the cable 2 is connected to a transceiver 3 which is disposed in a housing (not shown) secured to the steel cable. Measurement transducers, for example for temperature, pressure and the like, are located in this housing or, respectively, at the exterior thereof. The measured values generated by these measurement transducers are to be transmitted to the cable 2 to the above ground transceiver 1. The transceiver 3 is introduced into a drill hole together with the cable 2, the drill hole preferably being a matter of a well drill hole 10,000 m or greater deep. In terms of length, the cable is designed for a maximum drilling depth.

The transceiver 1 comprises a transmitter 4 and a receiver 5 which are respectively connected to a control and evaluation device 6. In a corresponding manner, the transceiver 3 comprises a transmitter 7 and a receiver 8 which are connected to a control and evaluation device 9. The control and evaluation device 6 actuates the transmitter 4 in accordance with the data transmitted to the transceiver 3, these data preferably being a matter of instructions with which the control and evaluation device 9 is called in for the transmission of the measured values. The transmitted measured values are acquired in the receiver 5 and are forwarded to the control and evaluation unit 6. The control and evaluation unit 9 actuates the transmitter 7, preferably in accordance with the measured values to be transmitted. However, data concerning the status of the circuit elements of the transceiver 3 can also be transmitted. The data coming from the transceiver 1 are acquired with the receiver 8 and are forwarded to the control and evaluation device 9.

Figure 2:
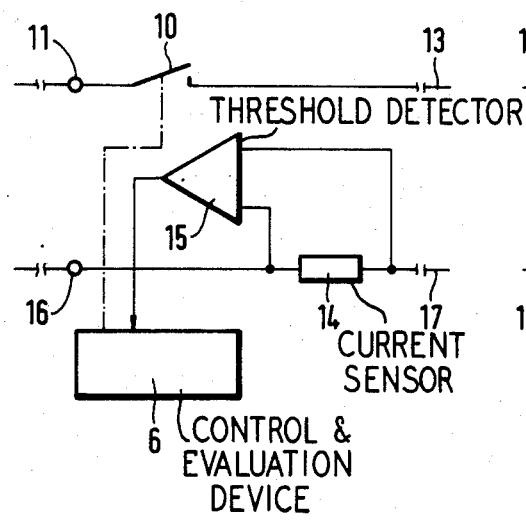
FIG. 2 is a block circuit diagram of the above ground transmitter and receiver.

Referring to FIG. 2, the transmitter 4 is preferably a contactless switch 10 (schematically illustrated) which is connected, on the one hand, to a pole 11 (for example the positive pole) of an energy source 12 (FIG. 1) and, on the other hand, is connected to a line 13 of the cable 2. The receiver 5 is composed of a current sensor 14 which is connected to an amplifier 15, which can be followed by a pulse shaper (not illustrated). The current sensor 14, designed as a resistor, is connected, on the one hand, to the second pole 16 of the energy source 12 and, on the other hand, to the other line 17 of the cable 2.

Figure 3:
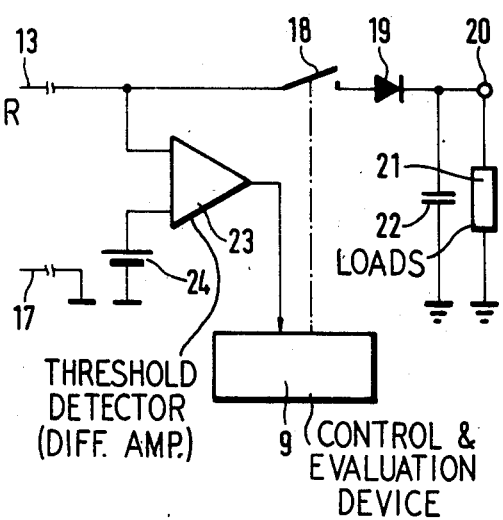
FIG. 3 is a block diagram of a first embodiment of a below ground transmitter and receiver.

Referring to FIG. 3, the transmitter 7 is likewise preferably designed as a contactless switch 18 (schematically illustrated) which is connected, on the one hand, to the line 13 and, on the other hand, to an operating voltage terminal 20 for the loads disposed in the transceiver 3, being connected thereto by way of a diode 19 which is poled in the conducting direction with respect to the polarity of the voltage at the pole 11 (FIGS. 1 and 2). The loads, the transmitter 7, the receiver 8, the control evaluation device 9 and the measurement transducers (not shown), are symbolically illustrated by a resistor 21. An energy accumulator, composed of a capacitor 22, an accumulator or a battery, is also connected to the operating voltage terminal 20. The receiver 8 comprises a threshold detector 23, a differential amplifier which has one input connected to the line 13 and the other input connected to a reference voltage source 24. The output of the threshold detector 23 is connected to the control and evaluation device 9. The switch 18 is controlled in accordance with the data to be transmitted.

Figure 4:
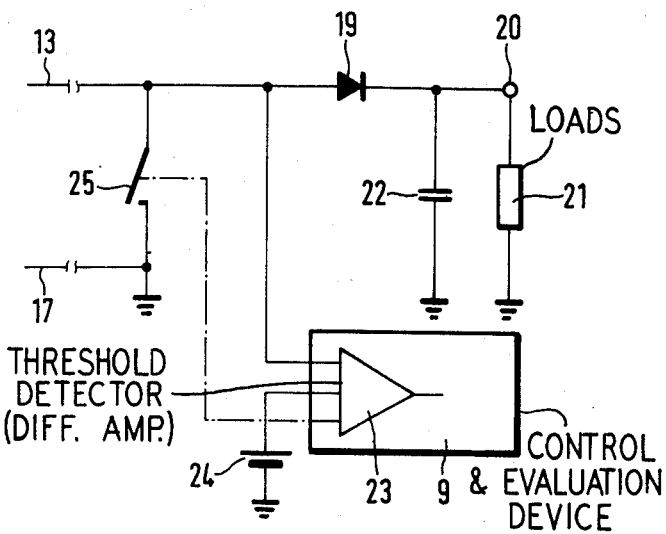
FIG. 4 is a block diagram of a second embodiment of the below ground transmitter and receiver.

Referring to FIG. 4, a different embodiment of the transceiver 3 comprises, preferably, a contactless switch 25 (schematically illustrated) actuatable by the control and evaluation device 9, the switch 25 bridging the two lines 13, 17. The line 13 is connected to the diode 19, to the capacitor 22 and to the resistor 21. The threshold detector 23 is likewise connected to the line 13 and to the reference voltage source 24.

Data are transmitted on the cable 2 in both directions. Data from the transmitter 4 are transmitted by means of successive current-carrying and current-free time intervals, i.e. in the form of pulses and pulse pauses. The data are preferably transmitted as PCM signals. The switch 10 (FIG. 2) is opened and closed in accordance with the data to be transmitted. The pole 11 is connected to the line 13 during the closed time of the switch 10. This means that the energy source 12 directly feeds the line 13. A pulse is therefore transmitted, the energy for the operation of the electrical circuits disposed in the drill hole being transmitted with this pulse. A portion of this energy is stored in the capacitor 22 (FIGS. 3 and 4). The data are transmitted in that the switch 10 is open. The telegraph or, respectively, the pulse train fed in with the transmitter 4 is acquired in the receiver 8 on the basis of the current-free time intervals. In the current-free time intervals, the diode 19 decouples the capacitor 22 from the line 13. The threshold detector 23 identifies, via the potentials available on the line 13, whether or not current is being fed. It forwards corresponding binary signals to the control at evaluation device 9 which decodes the received data and initiates corresponding control measures, for example the transmission of measured values by the transmitter. Currentless and current-carrying time intervals derive due to the opening and closing of the switch 18, whereby it is presumed that the threshold detector 23 receives only a negligibly small current via the line 13 through its input resistor, this current being capable of being compensated with a potentiometer connected parallel to the resistor 14. The currentless current-carrying time intervals form pulses and pulse pauses which are identified by the receiver 5 by way of the current sensor 14. The amplifier 15 forms corresponding binary signals which are processed by the control and evaluation device 6. During the currentless time intervals, the capacitor 22 supplies the loads 21 in the transceiver 3.

In the embodiment of a transceiver 3 shown in FIG. 4, the switch 25 is alternately opened and closed in coincidence with the data to be transmitted. Either the lower operating currents for the loads in the transceiver 3 or shortcircuit currents thereby flow via the lines 13, 17. Pulses and pulse pauses are formed in accordance with these amplitudes and are forwarded to the control and evaluation device 6.

Figure 5:
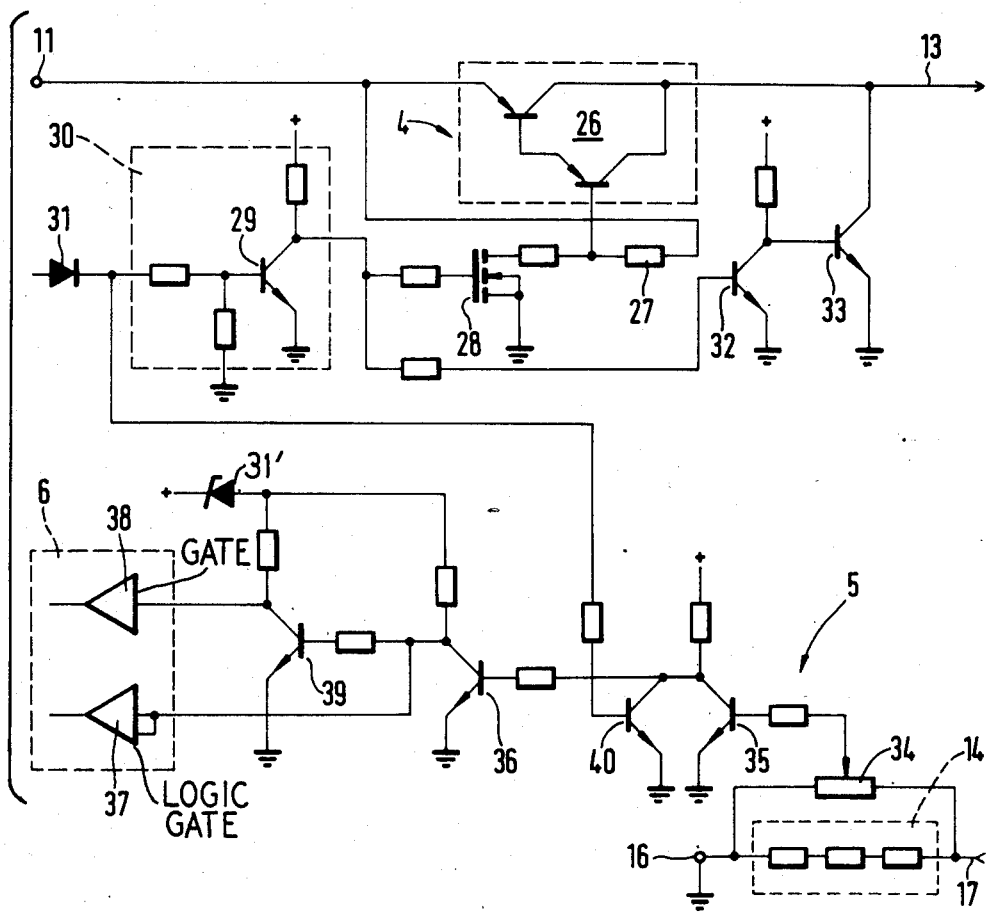
FIG. 5 is a circuit diagram of the above ground transmitter and receiver.

It can be seen from the arrangement of the transceiver 1, comprising the transmitter 4 and the receiver 5, that the switch 10 (FIG. 2) is composed of a Darlington transistor 26 (FIG. 5) whose base is connected via a resistor 27 to the pole 11. Instead of a Darlington transistor 26, a p-channel MOSFET for high currents and voltages can also be employed. Further, the base is connected via a resistor (not referenced in detail) to the drain electrode of a MOS field effect transistor 28 which is connected to the control and evaluation device 6 by way of an amplifier 30 containing a npn transistor 29 and via a diode 31 connected in series with the input thereof. The transistor 29 also feeds an npn transistor 32 whose collector is connected via a resistor (not referenced in detail) to the operating potential and to the base of an additional npn transistor 33 whose collector-emitter path is connected between the line 13 and ground.

When the control and evaluation device 6 does not feed a positive control signal in via the diode 31, the transistors 29, 32 and 33 are nonconductive. The field effect transistor 28 is conductive and likewise switches the Darlington transistor 26 conductive. When the control and evaluation device 6 emits a positive control signal to the diode 31, then the transistor 29 becomes conductive, whereupon the field effect transistor 28 and the Darlington transistor 26 become nonconductive, whereas the transistors 32, 33 become conductive. This has the advantage that the line 13 can be very quickly discharged via the conductively conditioned transistor 33 after the Darlington transistor 26 has switched into its high-resistance condition. A higher data transmission rate can therefore be achieved.

The current sensor 14, composed of three resistors (not referenced in detail) connected in series is connected in parallel with respect to a potentiometer 34 whose tap is connected by way of a resistor (not referenced in detail) to the base of an npn transistor 35 whose collector is connected via a further resistor to the base of an npn transistor 36. The collector of the transistor 36 is connected by way of the series connection of a resistor and a Zener diode to the operating potential. As a result of the Zener diode, the voltage is reduced to the logic level of a logic gate 37 connected to the collector of the transistor 36. A further gate 38 is connected to the collector of the transistor 36 by way of the collector of an additional transistor 39 which, just like the transistor 36, is supplied with operating voltage.

Figure 6:
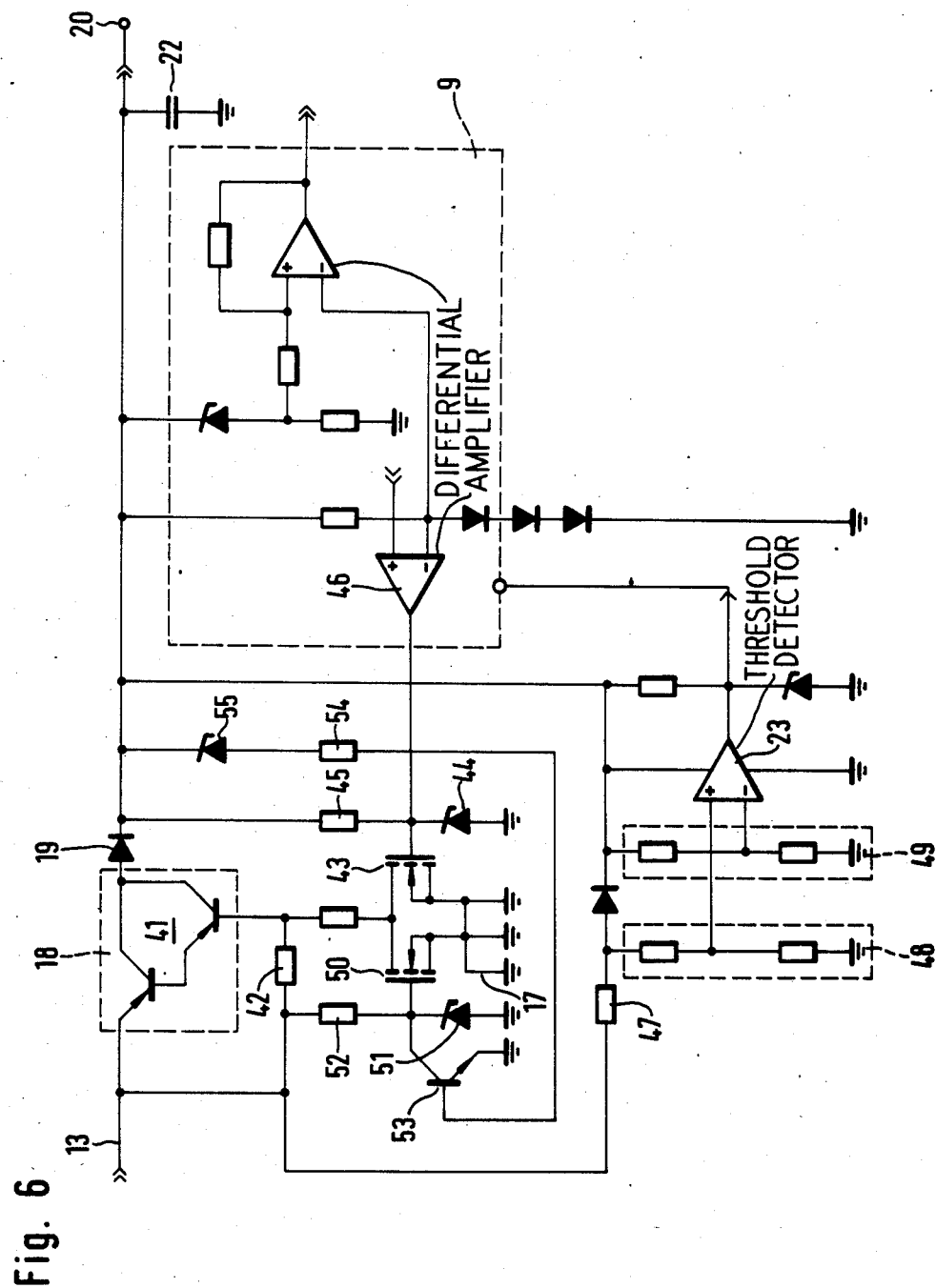
FIG. 6 is a circuit diagram of the below ground transmitter and receiver.

When current flows by way of the line 17, the transistor 35 is conductive, whereupon the transistor 36 is switched nonconductive. A high potential is then at the input of the gate 37, this producing a high potential at the output of the gate 37. This high potential is assigned, for example, to a binary "1". The transistor 39 is conductive, whereby a potential having the opposite binary significance is produced by way of the gate 38, the gate 38 operating, therefore, as an inverter. When no current flows by way of the line 17, then the transistor 35 is nonconductive, whereupon the transistor 36 is rendered conductive and the transistor 39 is switched nonconductive. This effects an inversion of the binary signals at the outputs of the gates 37, 38. The cathode of the diode 31' is connected to the base of a transistor 40 whose collector-emitter path is connected in parallel with that of the transistor 35. When the Darlington transistor 26 is rendered nonconductive via the control and evaluation device 6, the transistor 40 places the base of the transistor 36 to ground potential, so that the gates 37, 38 carry defined output potentials. The switch 18 of the below ground arrangement according to FIG. 6 is composed of a Darlington transistor 41 whose base is connected to the line 13 by way of a resistor 42. Instead of the transistor 41, a p-channel MOSFET, for example, 10 H and 300 V can be employed. Further, the base of the Darlington transistor 41 is connected by way of a resistor (not referenced in detail) to the drain electrode of a MOS field effect transistor 43 whose source electrode is connected via a resistor (not referenced in detail) to the drain electrode of a MOS field effect transistor 43 whose source electrode is connected by way of the line 17 to ground. The gate electrode of the field effect transistor 43 is connected to a Zener diode 44 which is connected by way of a resistor 45 to the cathode of the diode 19. Further, the gate electrode of the field effect transistor 43 is connected to the output of a differential amplifier 46 disposed in the control and evaluation device 9.

The line 13 is also connected by way of a resistor 47 to a first voltage divider 48 comprising two resistors whose tap is connected to an input of the threshold detector 23 whose other input is fed by the tap of a second voltage divider 49 connected to the operating voltage terminal 20. The resistor 47 and the voltage divider 48 are provided for overvoltage protection. When a high potential is applied to the line 13, given a closed condition of the switch 10 (FIG. 2) disposed above ground, the threshold detector 23 has a prescribed circuit status corresponding to the relationship of the two voltage dividers 48, 49. As a result of opening the switch 10, the potential on the line 13 drops, so that the threshold detector 23 changes into a different circuit state. In this manner, the pulses transmitted by actuating the switch 10 of the transmitter 4 are identified and are forwarded to the control and evaluation device 9.

When the transceiver 3 is switched to the transmit mode, the gate electrode of the field effect transistor 43 is applied to low potential at which the field effect transistor 43 becomes nonconductive. Given absence of a corresponding control signal at the control and evaluation device 9, the Darlington transistor 41 is switched conductive via the field effect transistor 43.

A field effect transistor 50 has its drain-source segment connected parallel to the field effect tansistor 43. The gate electrode of the field effect transistor 50 is connected to a Zener diode 51 which is applied, via a resistor 52, to the line 13. The collector-emitter path of the transistor 53 is connected parallel to the Zener diode 51, the base of the transistor 53 being connected by way of a series resistor 54 and a Zener diode 55 to the operating potential terminal 20. The circuit composed of the components 50–55 provides that, given a slowly rising output voltage, the Darlington transistor 41 remains open until the remaining electronics has an adequate operating voltage. It is therefore a matter of a start-up circuit.

The insulated copper core of the cable 2 is preferably the line 13, whereas the line 17 is the steel armour of the cable 2.

I claim:

1. A method of transmitting data between an above ground transceiver and an underground transceiver, located in a drill hole, over a two-wire line, comprising the steps of:

transmitting current pulses over the two-wire line as data from the above ground transceiver to the underground transceiver by interrupting the current flow between a power source and the two-wire line;

receiving and analyzing the data and applying the results to instruments connected to the underground transceiver;

storing a portion of the energy of the transmitted current pulses for use as an underground supply for the underground transceiver and the instruments connected to the underground transceiver during the pauses between the current pulses;

producing data at the underground instruments;

transmitting the data produced as current pulses to the above ground transceiver by repetitively interrupting the two-wire line; and receiving and analyzing the data transmitted from the underground transceiver.

2. The method of claim 1, wherein the steps of transmitting are further defined as:

transmitting pulse code modulated pulses.

3. Apparatus for transmitting data between an above ground location and an underground location, comprising:

an energy source including first and second poles at the above ground location;

a cable including first and second conductors extending between the above ground location and the underground location;

a first switch connected between said first pole and said first conductor and operable to alternately cause an interrupted current flow;

a current sensor at the above ground location connected to said second conductor and a first threshold detector connected to said current sensor and operable to poroduce output pulses in response to predetermined current flow;

a second switch at the underground location connected between said first conductor and an operating voltage load connection terminal;

a second threshold detector connected to a reference source and said first conductor and operable to produce output pulses in response to a predetermined current flow;

an energy accumulator connected to the operating voltage load connection terminal; and first and second evaluation and control devices respectively at said above ground and underground locations connected to said first and second threshold detectors and respectively to said first and second switches and operable to operate said switches for transmission and to analyze data represented by the output signals of said threshold detectors.

4. The apparatus of claim 3, wherein:

said first and second switches comprise contactless switches.

5. The apparatus of claim 3, wherein:

said first and second switches comprise Darlington transistors each including an emitter terminal and a collector terminal serially connected to the respective poles, conductor and load connection terminals and a base connected to a field effect transistor which includes a gate connected to the respective evaluation and control device.

6. The apparatus of claim 3, wherein:

said current sensor comprises a resistor.

7. The apparatus of claim 3, wherein:

said current sensor comprises a plurality of serially-connected resistors.

8. The apparatus of claim 3, and further comprising:

a potentiometer connected across said current sensor and including a tap; and a pulse shaper connected between said tap of said potentiometer and said evaluation and control device.

9. The apparatus according to claim 3, and further comprising:

first voltage divider connected between said first conductor and said second conductor and including a tap;

a second voltage divider connected between said operating voltage load connection terminal and said second conductor and including a tap; and wherein said second threshold detector comprises a differential amplifier including first and second inputs respectively connected to said taps.

10. The apparatus of claim 3, wherein:

said cable is an armoured steel cable including an insulated copper conductor constituting one of said first and second conductors and the steel armour constituting the other of said conductors.

* * * * *